(12) United States Patent
Guo et al.

(10) Patent No.: US 6,445,545 B1
(45) Date of Patent: Sep. 3, 2002

(54) APPARATUS FOR MINIMIZING HEAD OFF-TRACK DUE TO DISK FLUTTER

(75) Inventors: Lin Guo; Dennis Chen, both of Milpitas; Matthew O'Hara, Oakland, all of CA (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/532,057

(22) Filed: Mar. 21, 2000

(51) Int. Cl.$^7$ ............................................... G11B 21/16
(52) U.S. Cl. .................................................... 360/245.1
(58) Field of Search ........................... 360/245.1, 245.6

(56) References Cited

U.S. PATENT DOCUMENTS

| | | | | |
|---|---|---|---|---|
| 4,630,158 A | * | 12/1986 | Spash | 360/245 |
| 5,243,482 A | * | 9/1993 | Yamaguchi et al. | 360/245.4 |
| 5,602,699 A | * | 2/1997 | Khan | 360/245.6 |

* cited by examiner

*Primary Examiner*—David Davis
(74) *Attorney, Agent, or Firm*—David M. Sigmond

(57) ABSTRACT

A slider support structure is disclosed for minimizing off-rack due to disk flutter. In one embodiment, the slider support structure includes a gimbal assembly (306). The assembly (306) includes an outer ring (500) and an inner ring (502). The outer ring (500) is connected to the inner ring (502) via narrow strips (504 and 506) adjacent to the front (508) and back (510) surfaces of the slider body (512). The inner ring (502) is attached to the left (514) and right (516) surfaces of the slider body (512) via narrow strips (518 and 520). The strips (504 and 506) interconnecting the inner ring (502) and outer ring (500) define a flexible hinge that allows the slider body (512) to pivot relative to the assembly (306) about an axis (522) which, in this case, is the roll axis. Similarly, the strips (518 and 520) define a flexible hinge which allows the slider to pivot relative to the assembly (306) about another axis (524) which, in this case, is the pitch axis. The axes (522 and 524) are disposed close to the lower surface of the slider so that head off-track associated with such pivotal is minimized.

61 Claims, 3 Drawing Sheets

APPARATUS FOR MINIMIZING HEAD OFF-TRACK DUE TO DISK FLUTTER

FIELD OF THE INVENTION

The present invention relates in general to minimizing head off-track in a disk drive and, in particular, to a slider support structure and associated methodology for minimizing off-track due to disk flutter.

BACKGROUND OF THE INVENTION

A disk drive typically includes multiple disks that rotate on a spindle. Each disk normally has two surfaces for storing data in generally concentric data tracks. The data can be written onto the disk surfaces and read therefrom by transducer heads that are guided over the disk surfaces by an actuator arm. The actuator arm is driven by a voice coil motor controlled by a control system to position the transducer heads relative to the desired data tracks.

The transducer heads are generally mounted on a bottom surface of a support structure commonly referred to as a "slider". This slider, in turn, is typically connected to the actuator arm by way of a suspension load beam and torsion bar flexure. In operation, the torsion bar supports the slider such that the slider is in close proximity to the disk surface for improved data transfer as between a transducer head and an associated data track. In particular, this slider typically "flies" a small distance above the disk surface. This spacing between the slider and disk surface, sometimes referred to as an "air bearing", is maintained by way of interaction between flexural forces of the torsion bar pressing the slider towards the disk surface and hydrodynamic forces incident to travel of the slider over the rotating disk surface. The flexibility of the torsion arm allows the slider to lift off of the disk surface. In addition, the above-noted interaction between the flexural forces and hydrodynamic forces allows the slider to maintain a close spacing relative to the disk surface despite warpage of the disk surface or disk flutter. Such disk flutter may result from various forces including external vibrations and aerodynamic forces associated with turbulence.

Disk flutter results in angular displacements of the disk surface as well as vertical displacements. In order to allow the slider to closely track the disk surface, the slider is generally mounted on a pivot which is attached to the flexural structure. In particular, the slider may be attached to the torsion bar so that it can pivot about an axis generally parallel to the data track axis to allow the slider to roll and about an axis transverse to the data track axis to allow the slider to pitch. Generally, such pivoting is allowed by way of a ball joint or gimbal interface at the top of the slider.

While such support of the slider is generally effective in maintaining a close spacing between the bottom surface of the slider and the disk surface, the pivotal motion of the slider can result in off-track errors, i.e., displacement of a transducer on the bottom surface of the slider relative to the associated data track. As disk drive manufacturers continue to achieve closer spacing of the tracks on the disk surface, the component of off-track error due to disk flutter is becoming a more important consideration. In addition, as the rotating rate of disks is increased, the problem of disk flutter is requiring more attention.

SUMMARY OF THE INVENTION

The present invention is directed to structure and associated methodology for minimizing head off-track due to disk flutter. It has been recognized that the head-off-track displacement incident to rolling and pitching of the slider is proportional to the distance between the roll and pitch axes, on the one hand, and the location of the transducer head under consideration on the other. Because sliders have conventionally been supported and pivoted from the top surface of the slider, the above-noted distance has generally included the thickness of the slider as one component. In accordance with the present invention, off-track due to flutter is reduced by configuring the slider support so that a pivot axis or axes are located closer to the transducer head. In addition, a support structure configuration is disclosed that allows the pivot axis or axes to be moved closer to the disk surface without unduly increasing the possibility of disk crashes (i.e., contact between the support structure and the disk surface).

According to one aspect of the present invention, an apparatus for use in reducing transducer head off-track displacement in a disk drive is provided. The apparatus is used in a disk drive wherein a transducer head is carried over a disk surface by an actuator arm. The inventive apparatus includes a slider body for carrying the transducer head, a load beam for use in supportably interconnecting the slider body to the actuator arm, and a gimbal structure for forming an interconnection between the slider body and the load beam. The slider body has a lower surface and an upper surface, where the transducer head is disposed adjacent to the lower surface. The gimbal structure may define first and second pivot axes, where one of the pivot axes allows the slider body to roll relative to the gimbal structure and the other axis allows the slider body to pitch relative to the gimbal structure. The gimbal structure forms the interconnection between the slider body and the load beam such that the slider body is pivotable relative to a first pivot axis that is located between the lower surface of the slider body and the upper surface of the slider body. Preferably, the pivot axis is located closer to the lower surface of the slider body than to the upper surface. In this regard the pivot axis is located a distance from the bottom surface that is preferably no more than ten percent, and more preferably no more than about five percent, of the distance between the lower surface and the upper surface.

In accordance with another aspect of the present invention, a gimbal apparatus is provided for use in interconnecting a slider body to a support structure associated with an actuator arm of a disk drive. The gimbal apparatus includes first structure for forming a first flexible connection to the slider body and second structure for forming a second flexible connection to the slider body. The first connection and second connection are formed on side surfaces of the slider body between an upper surface and a lower surface of the slider body. Preferably, the gimbal structure includes a peripheral portion extending beyond the side surface of the slider body, wherein the peripheral portion is disposed a distance above the bottom surface of the slider body such that the slider body can pivot relative to the gimbal structure without causing contact between the peripheral portion of the gimbal structure and the disk surface. In one embodiment, the gimbal structure includes a first annular ring and a second annular ring peripherally extending about the slider body. The inner ring is flexibly connected to the slider body on left and right sides of the slider body so as to define a first pivot axis. The outer gimbal ring is flexibly connected to the inner gimbal ring adjacent to the front and back sides of the slider body so as to define a second pivot axis. The annular rings thereby allow the slider body to pitch and roll so as to maintain close spacing between a transducer head and the disk surface. Moreover, the configuration of the gimbal structure to define pivot axes between the upper and lower surfaces of the slider body reduces off-track due to disk flutter while having sufficient space to prevent all disk crashes.

BRIEF DESCRIPTION OF THE DRAWING

For a more complete understanding of the present invention and further advantages thereof, reference is now made to the following detailed description taken in conjunction with the drawings, in which.

DETAILED DESCRIPTION OF THE INVENTION

Figure 1:
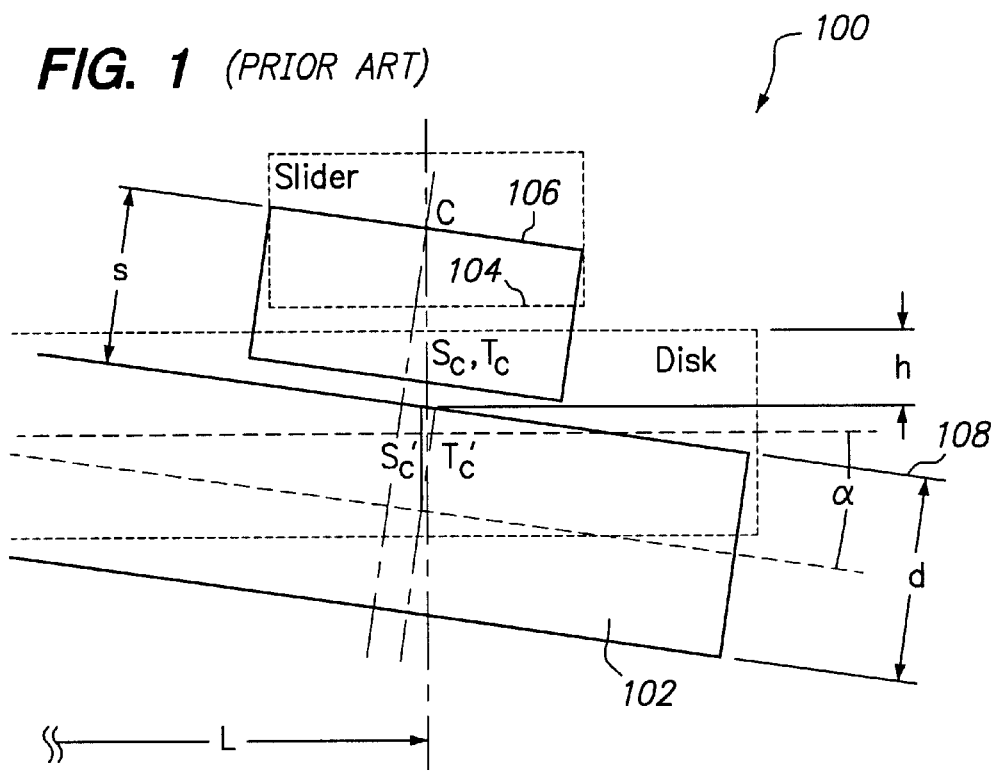
FIG. 1 is a schematic diagram illustrating off-track associated with disk flutter in a prior art disk drive.

The present invention reduces transducer head off-track due to disk flutter by locating one, or preferably both, of the roll and pitch axes closer to the transducer head. FIG. 1 is a schematic illustration of a prior art disk drive 100. In particular, FIG. 1 shows a side view of a disk 102 and of a slider body 104. The disk 102 and slider body 104 are shown in a deflected position that may result, for example, from disk flutter. Disk flutter can be caused by various forces. A common cause of disk flutter is aerodynamic forces associated with turbulence. This is an increasing problem in disk drives as disk drives operate at increasing revolution rates. Today, it is common for disk drives to operate at rates of 7200 rpm or higher. It will be appreciated that the displacements associated with disk flutter may be relatively small and transient. As a result, not all of these displacements are compensated for by servo loop control of head tracking. Nonetheless, as disk drive manufacturers continue to increase the track density on a disk surface (e.g. increased tracks per inch) even the small displacements associated with disk flutter and the associated off-track is becoming an increasingly important design consideration.

In FIG. 1, a deflected position of the disk 102 and slider body 104 are shown in solid lines and an undeflected position of these components is shown in phantom. In the illustrated conventional disk drive 100, the slider body 104 is supported so that it has a pivot axis at C. As illustrated, the pivot axis is located proximate to the upper surface 106 of the slider body 104. Although only one pivot axis is shown in the perspective of the figure, it will be appreciated that a second, transverse pivot axis is generally also provided proximate to the upper surface 106. In the figure, the disk is shown as deflected by an angle $\alpha$.

FIG. 1 illustrates a number of points and dimensions that are relevant to understanding track offset associated with disk flutter. In particular, as previously noted, C is the roll pivot axis or roll center, $S_C$ is the slider center, $T_C$ is the track center, s is the distance between the slider roll center and the disk surface, d is the disk thickness, h is the magnitude of the disk vibration in the axial direction, $S_C'$ is the head slider center after disk deformation and $T_C'$ is the track center after disk deformation. Note that, before the disk is deformed, track offset is assumed to be zero. In other words, $S_C$ and $T_C$ are assumed to be at the same location. In the figure, the deformation angle $\alpha$ is given as $$\alpha = f\frac{h}{L} \quad (1)$$

where L is the distance between the spacer/clamp outer rim and $T_C$ and $f$ is a scaling factor. It is found that the biggest deformation is at OD and the corresponding scaling factor of around 1.2 is predicted by analysis.

The head off-track caused by disk vibration is the distance between $S_C'$ and $T_C'$ and is given as:

$$Ot = S_c' - T_c' = s\tan(\alpha) - h\sin(\alpha) + 0.5D\tan(\alpha) = (s + 0.5D - h)f\frac{h}{L}$$

Since the axial displacement h is on the order of a couple of micrometers which is much smaller than the other term in the parenthesis, this term can be dropped and the above expression can be further simplified to yield:

$$Ot \cong 1.2(s + 0.5D)\frac{h}{L} \quad (2)$$

In the cases where nano sliders and standard 3.5 inch disks are used, s=0.432 mm, D=0.8 mm and L=32.4 mm (OD case). Then we get:

$$Ot = 0.031\ h \quad (3)$$

This gives a direct relationship between the off-track and the axial displacement. The scaling factor of 0.031 is close to what has been observed empirically.

From equation (2) it will be observed that a significant component of head off-track in the conventional geometry is the distance S between the upper surface 108 of the disk 102 and the upper surface 106 of the slider body 104. This distance is basically the sum of the thickness of the slider body 104 and the air bearing separating the slider body 104 from the disk 102.

Figure 2:
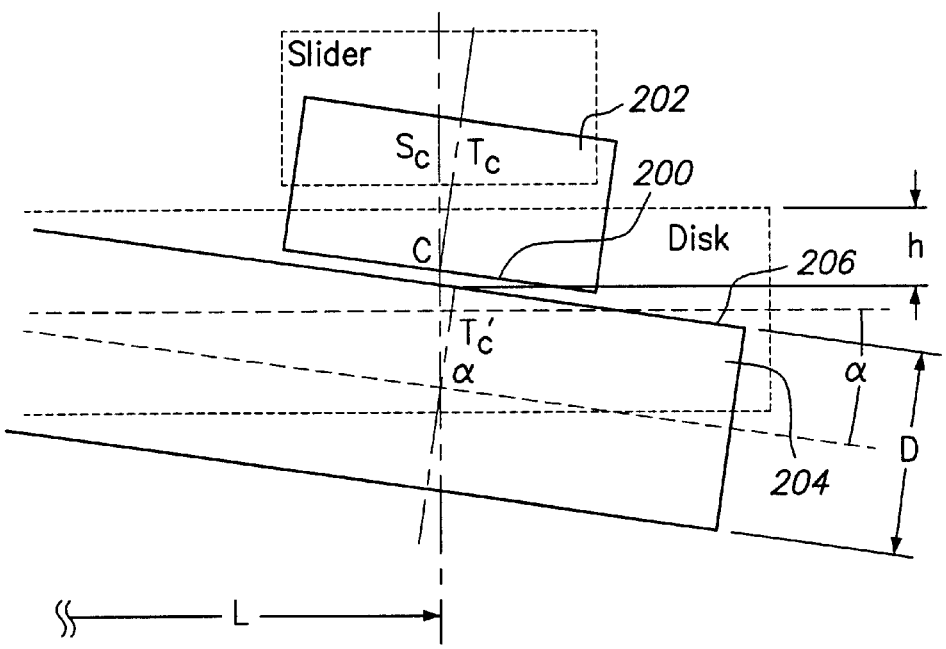
FIG. 2 is a schematic diagram illustrating the reduced off-track associated with disk flutter in accordance with the present invention.

The present invention reduces off-track by locating the pivot axis or axes closer to the disk surface. A geometry in accordance with the present invention is generally illustrated in FIG. 2. For ease of reference, corresponding points and dimensions in FIGS. 1 and 2 are identified by corresponding labels. Ideally, the roll center C would be moved as close as possible to the disk surface to reduce off-track associated with disk flutter. In this regard, if C was moved all the way to the disk surface, s would become zero and off-track would be greatly reduced. For practical reasons, as will be discussed in greater detail below, C is positioned somewhat above the lower surface 200 of the slider body 202 so as to reduce the likelihood of contact between the suspension and the disk. Using the equation set forth above, in the ideal case where s was reduced to zero, the head off-track due to disk flutter would become:

$$Ot \cong 1.2 \cdot 0.5 D \frac{h}{L}$$

In other words, the contribution to the head off-track from the slider thickness would be completely eliminated.

Figure 3:
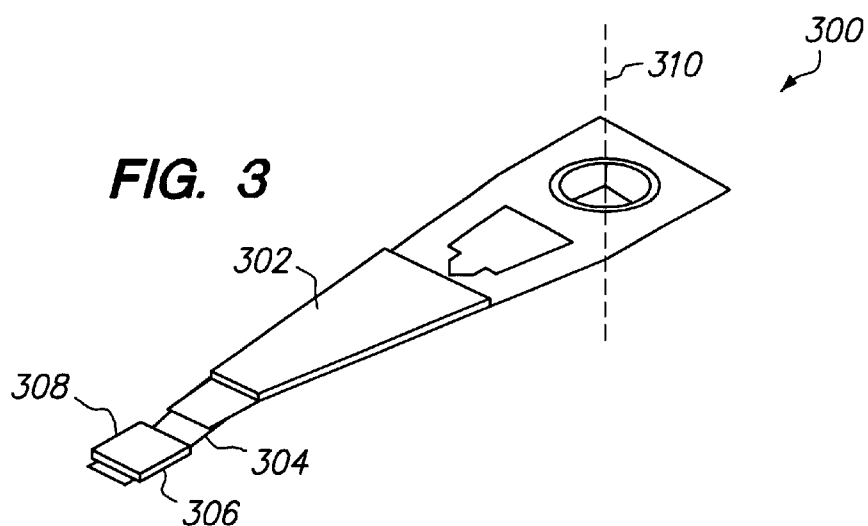
FIG. 3 is a perspective view showing an actuator arm and a gimbal assembly in accordance with the present invention.
Figure 4:
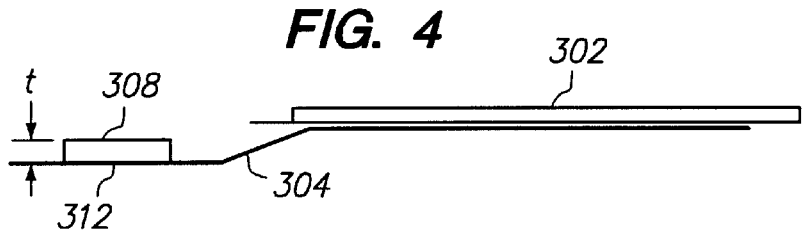
FIG. 4 is a side view of the actuator arm and gimbal assembly of FIG. 3.

FIGS. 3–7 illustrate a practical implementation of the present invention. Referring first to FIGS. 3 and 4, perspective and side views, respectively, of a slider support system 300 are shown. The slider support system 300 generally includes a suspension arm 302, a torsion bar 304, and a gimbal assembly 306 supporting a slider body 308. These suspension elements are attached to an actuator arm which pivots in order to move the slider body 308 across the surface of a disk for searching and tracking. Alternatively, the actuator arm may drive the slider body 308 linearly across the disk surface. Bending of the body of the suspension arm 302 provides a loading to urge the slider body 308 against a disk surface. In operation, hydrodynamic forces generated by travel of the slider body over the disk surface act against this downward force so that the slider flies a small distance over the disk surface. It will thus be appreciated that the slider body 308 is generally maintained in close proximity to the disk surface.

As can be seen in FIG. 4, the gimbal assembly 306 is connected to the slider body 308 adjacent to a lower surface 312 of the slider body 308. As will be discussed in more detail below, the gimbal assembly 306 is preferably configured to define pitch and roll pivot axes that are separated from the lower surface 312 by a distance that is no more than about ten percent and, more preferably, no more than about five percent, of the thickness t of the slider body 308. Preferably, these axes are disposed a distance of less than about 0.06 mm and, more preferably, less than about 0.03 mm from the lower surface 312.

Figure 5:
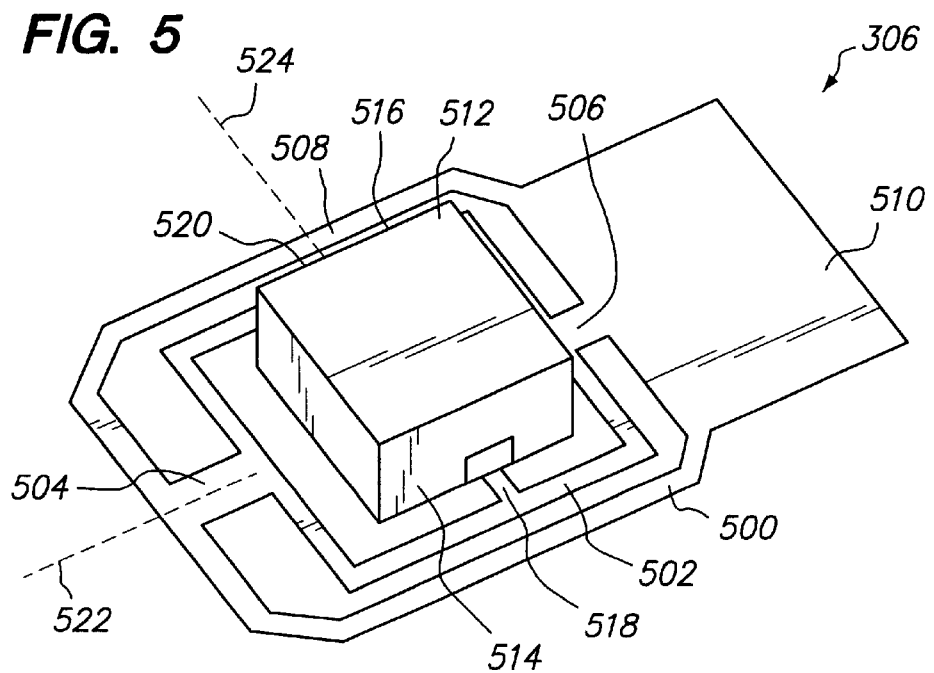
FIG. 5 is a perspective view of the gimbal assembly of FIG. 3.

FIG. 5 shows details of the gimbal assembly 306. The assembly 306 generally includes an outer ring 500 and an inner ring 502. In practice, the outer ring and inner ring can be stamped from a single sheet of metal. For example, the rings 500 and 502 may be formed from a sheet of 300 Series SST metal having a thickness of 0.001 inch. The outer ring 500 is connected to the inner ring 502 via narrow strips 504 and 506 adjacent to the front 508 and back 510 surfaces of the slider body 512. The inner ring 502 is attached to the left 514 and right 516 surfaces of the slider body 512 via narrow strips 518 and 520. The strips 518 and 520 may be attached to the surfaces 514 and 516 by way of a locking interconnection, adhesive, or other appropriate means. The strips 504 and 506 interconnecting the inner ring 502 and outer ring 500 define a flexible hinge that allows the slider body 512 to pivot relative to the assembly 306 about an axis 522 which, in this case, is the roll axis. Similarly, the strips 518 and 520 define a flexible hinge which allows the slider to pivot relative to the assembly 306 about another axis 524 which, in this case, is the pitch axis. The illustrated assembly 306 thus provides two degrees of rotational freedom for the slider to follow the disk surface during flutter. Moreover, because the axes 522 and 524 are disposed close to the lower surface of the slider, the head off-track associated with such pivotal motion is minimized.

As shown in FIG. 5, the gimbal assembly 306 extends beyond the side surfaces 508, 510, 514 and 516 of the slider. It is an important design consideration to reduce the likelihood of disk crashes. In the case of the illustrated gimbal assembly 306, this means avoiding contact between the outer ring 500 and the disk surface. It will be appreciated that the potential for disk crashes is dependent on a number of factors including the distance that the outer ring extends beyond the slider body and the anticipated angular displacement of the disk and slider body. There are two situations in which the outer ring edge may touch the disk. The first situation is a static roll attitude where the slider body is misaligned relative to the gimbal assembly due to manufacturing tolerances. The other situation is the dynamic case. In the dynamic case, the disk is vibrating and the slider is following it such that the slider body is pivoted relative to the gimbal assembly.

Figure 6:
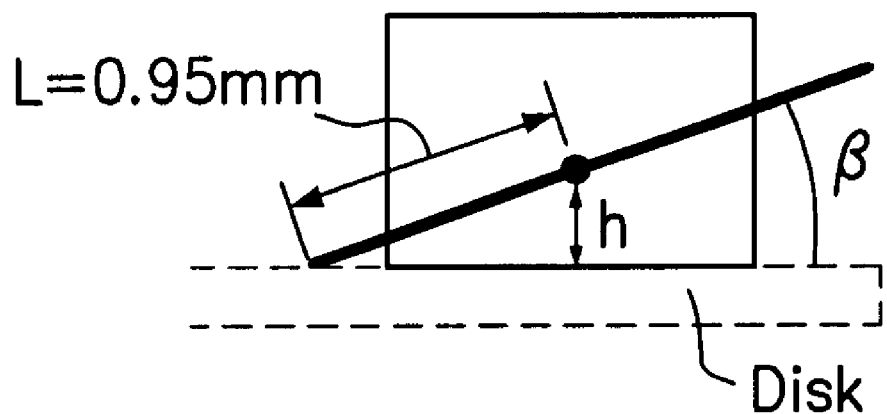
FIG. 6 is a schematic diagram illustrating a preferred geometry of a gimbal assembly in accordance with the present invention for a static case.

FIG. 6 illustrates the static case. A practical manufacturing tolerance may allow for a misalignment β between the gimbal assembly and the slider body of about 0.5 degrees. Allowing for twice this manufacturing tolerance (or a total of one degree of misalignment) and using a distance L of 0.95 mm for the distance between the roll axis and the outer edge of the gimbal assembly, the offset height needed due to static roll, $h_S$, is calculated as follows:

$h_s$=0.95*sin(2*0.5)=0.0166 mm

This indicates that the gimbal assembly should be attached to the slider body at a distance of 0.0166 mm above the bottom surface of the slider body in order to avoid crashes due to the static roll attitude.

Figure 7:
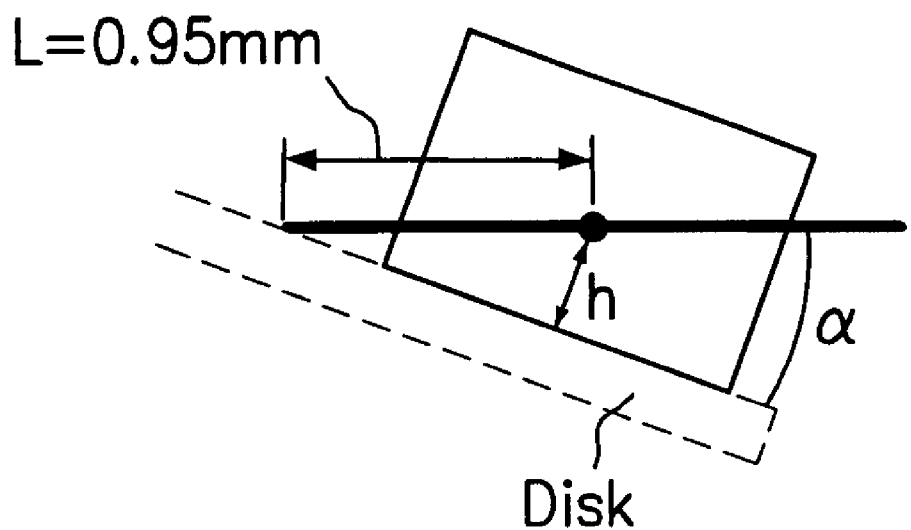
FIG. 7 is a schematic diagram illustrating a preferred geometry of a gimbal system in accordance with the present invention for a dynamic case.

FIG. 7 illustrates the dynamic case. Specifically, FIG. 7 illustrates the worst case in which the gimbal assembly is assumed to remain in its normal orientation while the slider is following the disk. In reality, the gimbal assembly would be expected to follow the slider body to some extent due to torsional forces. Assuming a typical 3.5 in/0.8 mm disk spinning at 7200 rpm, the motion in the vertical (axial) direction is expected to be approximately 50 micro-inches. The calculation below assumes twice this displacement or 100 micro-inches in order to provide a safety margin. From equation (1) above the angle α may be determined as follows:

$$\alpha = \frac{1.2 * 100}{1000000} = 0.00012 \text{ rad}$$

Accordingly, the offset displacement for the dynamic case hd can be calculated as follows $h_d$=0.95*sin(α)=0.000114 mm In order to have a good non-op shock resistance, the loadbeam of the suspension is extended forward to function like a limiter when under a shock load. In normal operation, the slider retains as a non-dimple configuration and has no contact with the loadbeam. Applying a shock resistance criterion of 200 g acceleration to the current design, a maximum deflection of 0.012 mm was analyzed. Therefore, an additional off-set height due to non-op shock consideration. $h_{shock}$=0.012 mm should be included to prevent interference with the disk surface under non-op shock.

Conservatively combining the effects caused by the static roll, the dynamic consideration, and the non-op shock resistance, total offset height, h, is calculated as follows:

$h=h_s+h_d+h_{shock}$=0.028714 mm.

For pico sliders the thickness is s=0.301 mm. Hence, h is a small fraction of the total thickness:

$h/s$=9.5%.

In other words, with all the above design considerations included, the slider motion due to disk flutter still can be effectively reduced by 90.5% in this new design.

It will be appreciated that the value of h used in relation to the slider body thickness may be increased in order to accommodate greater manufacturing tolerances, to accommodate wider gimbal assemblies or, more generally, to provide a greater margin to protect against disk crashes. Accordingly, off-track can be minimized in accordance with the present invention where h is no more than about 10% of the slider body thickness and, more preferably, no more than about 5% of the slider body thickness.

| Characteristics | |
| --- | --- |
| Part Length (center of susp. Base-plate to gimbal center) | 18.00 mm |
| Flexure thickness | 0.025 mm |
| Load beam thickness | 0.0635 mm |
| Spring Rate | 10.8 N/m |
| Rolling Stiffness | 1.858 mN*m/deg |
| Pitching Stiffness | 1.143 mN*m/deg |
| First Torsion Freq. | 2,947 Hz |
| Second Torsion Freq. | 6,241 Hz |
| Sway Mode Freq. | >10 kHz |
| Minimum disk spacing | 1.65 mm |

It is noted that the stiffness in each direction is comparable to conventional designs indicating that desirable air-bearing characteristics are maintained. Moreover, given that this configuration achieves pitch and roll stiffness similar to traditional dimpled suspensions, current designs can be readily adapted for use with the inventive gimbal system.

Although the present invention has been described in several embodiments, various changes and modifications may be suggested to one skilled in the art. It is intended that the present invention encompass such changes and modifications that fall within the scope of the appended claims.

What is claimed is:

1. An apparatus for use in reducing transducer head off-track displacement in a disk drive wherein the transducer head is carried over a disk surface by an actuator arm, said apparatus comprising:
    a slider body for carrying said transducer head, said slider body having a lower surface and an upper surface on an opposite side of said slider body from said lower surface, wherein said transducer head is disposed adjacent to said lower surface, and said lower surface faces said disk surface;
    a load beam for use in supportably interconnecting said slider body to said actuator arm; and
    a gimbal structure for forming an interconnection between said slider body and said load beam such that said slider body is pivotable relative to a first pivot axis, wherein said gimbal structure does not overlap said upper surface;
    said interconnection between said slider body and said load beam being configured such that said first pivot axis is located between said lower surface of said slider body and said upper surface of said slider body, and said first pivot axis is located closer to said lower surface than to said upper surface.

2. An apparatus as set forth in claim 1, wherein said interconnection between said slider body and said load beam is configured such that said first pivot axis is located at least twice as close to said lower surface than to said upper surface.

3. An apparatus as set forth in claim 1, wherein said first pivot axis comprises a roll axis that is generally aligned with a track axis of said disk surface in operation, whereby said slider body can roll relative to said gimbal structure so as to follow said disk surface.

4. An apparatus as set forth in claim 1, wherein said first pivot axis comprises a pitch axis that is generally parallel to said disk surface and transverse to a track axis of said disk surface in operation, whereby said slider body can pitch relative to said gimbal structure so as to follow said disk surface.

5. An apparatus as set forth in claim 1, wherein said gimbal structure forms said interconnection between said slider body and said load beam such that said slider body is pivotable relative to a second pivot axis located between said upper surface and said lower surface of said slider body.

6. An apparatus as set forth in claim 1, wherein said gimbal structure includes a peripheral portion extending beyond a side surface of said slider body between said upper surface and said lower surface of said slider body, wherein said peripheral portion is disposed a distance above said lower surface such that said slider body can pivot relative to said gimbal structure without causing contact between said peripheral portion of said gimbal structure and said disk surface.

7. An apparatus as set forth in claim 1, wherein said first pivot axis is located above said lower surface by a first distance that is no more than about 10% of a second distance between said lower surface and said upper surface.

8. An apparatus as set forth in claim 7, wherein said first distance is no more than about 5% of said second distance.

9. An apparatus as set forth in claim 1, wherein said pivot axis is defined by a flexible hinge.

10. An apparatus as set forth in claim 1, wherein said gimbal structure is attached to at least two side surfaces of said slider body.

11. An apparatus as set forth in claim 1, wherein said gimbal structure is attached to four side surfaces of said slider body.

12. A gimbal apparatus for use in providing a supporting interconnection between a slider body and support structure associated with an actuator arm of a disk drive, said slider body including a lower surface on which a transducer head is mounted, an upper surface opposite said lower surface, and side surfaces including a front surface at a forward end of said slider body relative to a direction of travel of said slider body over a disk surface as said lower surface faces said disk surface, a rear surface opposite said front surface, and left and right surfaces, said gimbal apparatus not extending within a surface area of said upper surface above said upper surface, said gimbal apparatus comprising:
    first structure for forming a first flexible connection to said slider body at a first location on a first one of said side surfaces; and
    second structure for forming a second flexible connection to said slider body at a second location on a second one of said side surfaces;
    said first and second flexible connections defining a first pivot axis disposed between said upper surface and said lower surface of said slider body, and said first and second flexible connections being configured such that said first pivot axis is located closer to said lower surface than to said upper surface.

13. An apparatus set forth in claim 12, wherein said first and second flexible connections are configured such that said first pivot axis is located at least twice as close to said lower surface than to said upper surface.

14. An apparatus as set forth in claim 12, wherein said first pivot axis comprises a roll axis that is generally aligned with a track axis of said disk surface in operation, whereby said slider body can roll so as to follow said disk surface.

15. An apparatus as set forth in claim 12, wherein said first pivot axis comprises a pitch axis that is generally parallel to said disk surface and transverse to a track axis of said disk surface in operation, whereby said slider body can pitch so as to follow said disk surface.

16. An apparatus as set forth in claim 12, further comprising a flexible hinge structure for forming an interconnection between said slider body and said load beam such that said slider body is pivotable relative to a second pivot axis located between said upper surface and said lower surface of said slider body.

17. An apparatus as set forth in claim 16, wherein said first location is adjacent to said left surface, and said second location is adjacent to said right surface, and said flexible hinge structure includes a third structure for forming a third flexible connection adjacent to said front surface and a fourth structure for forming a fourth flexible connection adjacent to said rear surface.

18. An apparatus as set forth in claim 12, further comprising a support structure associated with said first structure and said second structure, said support structure including a peripheral portion extending beyond a side surface of said slider body between said upper surface and said lower surface of said slider body, wherein said peripheral portion is disposed a distance above said lower surface such that said slider body can pivot relative to said gimbal apparatus without causing contact between said peripheral portion of said gimbal apparatus and said disk surface.

19. An apparatus as set forth in claim 12, wherein said first pivot axis is located above said lower surface by a first distance that is no more than about 10% of a second distance between said lower surface and said upper surface.

20. An apparatus as set forth in claim 19, wherein said first distance is no more than about 5% of said second distance.

21. An apparatus as set forth in claim 12, wherein each of said first structure and said second structure comprises a flexible hinge.

22. A disk drive, comprising:
a disk that includes a disk surface;
a gimbal assembly that includes an inner ring and an outer ring, wherein the inner ring is concentrically disposed within the outer ring; and
a slider body that includes an upper surface, a lower surface, a front surface, a rear surface, a first side surface, a second side surface and a transducer head, wherein the slider body is concentrically disposed within the inner ring, the front surface faces into a relative motion of the disk surface, the lower surface faces the disk surface, the transducer head provides data transfer with the disk surface, and the gimbal assembly provides a pivot axis for the slider body that is closer to the lower surface than to the upper surface.

23. The disk drive of claim 22, wherein the inner ring is attached to the outer ring by a first strip located in front of the front surface and between the side surfaces and a second strip located behind the rear surface and between the side surfaces.

24. The disk drive of claim 23, wherein the inner ring is attached to the outer ring only by the first and second strips.

25. The disk drive of claim 23, wherein the first and second strips provide a flexible hinge that allows the slider body to pivot about a roll axis that is closer to the lower surface than to the upper surface.

26. The disk drive of claim 22, wherein the inner ring is attached to the slider body by a first side strip located between the inner ring and the first side surface and a second side strip located between the inner ring and the second side surface.

27. The disk drive of claim 26, wherein the inner ring is attached to the slider body only by the first and second side strips.

28. The disk drive of claim 26, wherein the first and second side strips provide a flexible hinge that allows the slider body to pivot about a pitch axis that is closer to the lower surface than to the upper surface.

29. The disk drive of claim 22, wherein the gimbal assembly is attached to the slider body only at the side surfaces.

30. The disk drive of claim 22, wherein the gimbal assembly does not extend within a surface area of the slider body.

31. The disk drive of claim 22, wherein the gimbal assembly provides a roll axis and a pitch axis for the slider body that are each closer to the lower surface than to the upper surface.

32. A disk drive, comprising:
a disk that includes a disk surface;
a gimbal assembly that includes an inner ring and an outer ring, wherein the inner ring is concentrically disposed within the outer ring; and
a slider body that includes an upper surface, a lower surface, a front surface, a rear surface, a first side surface, a second side surface and a transducer head, wherein the slider body is concentrically disposed within the inner ring, the front surface faces into a relative motion of the disk surface, the lower surface faces the disk surface, the transducer head provides data transfer with the disk surface, the gimbal assembly provides a pivot axis for the slider body that is between the lower surface and the upper surface and is closer to the lower surface than to the upper surface, and the gimbal assembly does not extend within a surface area of the slider body.

33. The disk drive of claim 32, wherein the inner ring is attached to the outer ring by a first strip located in front of the front surface and between the side surfaces and a second strip located behind the rear surface and between the side surfaces.

34. The disk drive of claim 33, wherein the inner ring is attached to the outer ring only by the first and second strips.

35. The disk drive of claim 33, wherein the first and second strips provide a flexible hinge that allows the slider body to pivot about a roll axis that is at least five times closer to the lower surface than to the upper surface.

36. The disk drive of claim 32, wherein the inner ring is attached to the slider body by a first side strip located between the inner ring and the first side surface and a second side strip located between the inner ring and the second side surface.

37. The disk drive of claim 36, wherein the inner ring is attached to the slider body only by the first and second side strips.

38. The disk drive of claim 36, wherein the first and second side strips provide a flexible hinge that allows the slider body to pivot about a pitch axis that is at least five times closer to the lower surface than to the upper surface.

39. The disk drive of claim 32, wherein the gimbal assembly is attached to the slider body only at the side surfaces.

40. The disk drive of claim 32, wherein the gimbal assembly is attached to the side surfaces by adhesives.

41. The disk drive of claim 32, wherein the gimbal assembly provides a roll axis and a pitch axis for the slider body that are each at least five times closer to the lower surface than to the upper surface.

42. A disk drive, comprising:

a disk that includes a disk surface;

a gimbal assembly that includes a ring; and a slider body that includes an upper surface, a lower surface, a front surface, a rear surface, a first side surface, a second side surface and a transducer head, wherein the slider body is concentrically disposed within the ring, the front surface faces into a relative motion of the disk surface, the lower surface faces the disk surface, the transducer head provides data transfer with the disk surface, and the gimbal assembly provides a pivot axis for the slider body that is closer to the lower surface than to the upper surface.

43. The disk drive of claim 42, wherein the gimbal assembly does not contact the upper surface.

44. The disk drive of claim 43, wherein the gimbal assembly does not overlap the upper surface.

45. The disk drive of claim 43, wherein the entire upper surface is exposed.

46. The disk drive of claim 42, wherein the ring is attached to the slider body by a first side strip located between the ring and the first side surface and a second side strip located between the ring and the second side surface.

47. The disk drive of claim 46, wherein the ring is attached to the slider body only by the first and second side strips.

48. The disk drive of claim 46, wherein the first and second side strips provide a flexible hinge that allows the slider body to pivot about a pitch axis that is closer to the lower surface than to the upper surface.

49. The disk drive of claim 42, wherein the gimbal assembly is attached to the slider body only at the side surfaces.

50. The disk drive of claim 42, wherein the gimbal assembly does not extend within a surface area of the slider body.

51. The disk drive of claim 42, wherein the gimbal assembly provides a roll axis and a pitch axis for the slider body that are each closer to the lower surface than to the upper surface.

52. A disk drive, comprising:

a disk that includes a disk surface;

a gimbal assembly that includes a ring; and a slider body that includes an upper surface, a lower surface, a front surface, a rear surface, a first side surface, a second side surface and a transducer head, wherein the slider body is concentrically disposed within the ring, the front surface faces into a relative motion of the disk surface, the lower surface faces the disk surface, the transducer head provides data transfer with the disk surface, the gimbal assembly provides a pivot axis for the slider body that is between the lower surface and the upper surface and is closer to the lower surface than to the upper surface, and the gimbal assembly does not extend within a surface area of the slider body.

53. The disk drive of claim 52, wherein the entire front surface is exposed.

54. The disk drive of claim 52, wherein the entire rear surface is exposed.

55. The disk drive of claim 52, wherein the entire upper surface is exposed.

56. The disk drive of claim 52, wherein the ring is attached to the slider body by a first side strip located between the ring and the first side surface and a second side strip located between the ring and the second side surface.

57. The disk drive of claim 56, wherein the ring is attached to the slider body only by the first and second side strips.

58. The disk drive of claim 56, wherein the first and second side strips provide a flexible hinge that allows the slider body to pivot about a pitch axis that is at least five times closer to the lower surface than to the upper surface.

59. The disk drive of claim 52, wherein the gimbal assembly is attached to the slider body only at the side surfaces.

60. The disk drive of claim 52, wherein the gimbal assembly is attached to the side surfaces by adhesives.

61. The disk drive of claim 52, wherein the gimbal assembly provides a roll axis and a pitch axis for the slider body that are each at least five times closer to the lower surface than to the upper surface.

* * * * *